UNITED STATES PATENT OFFICE.

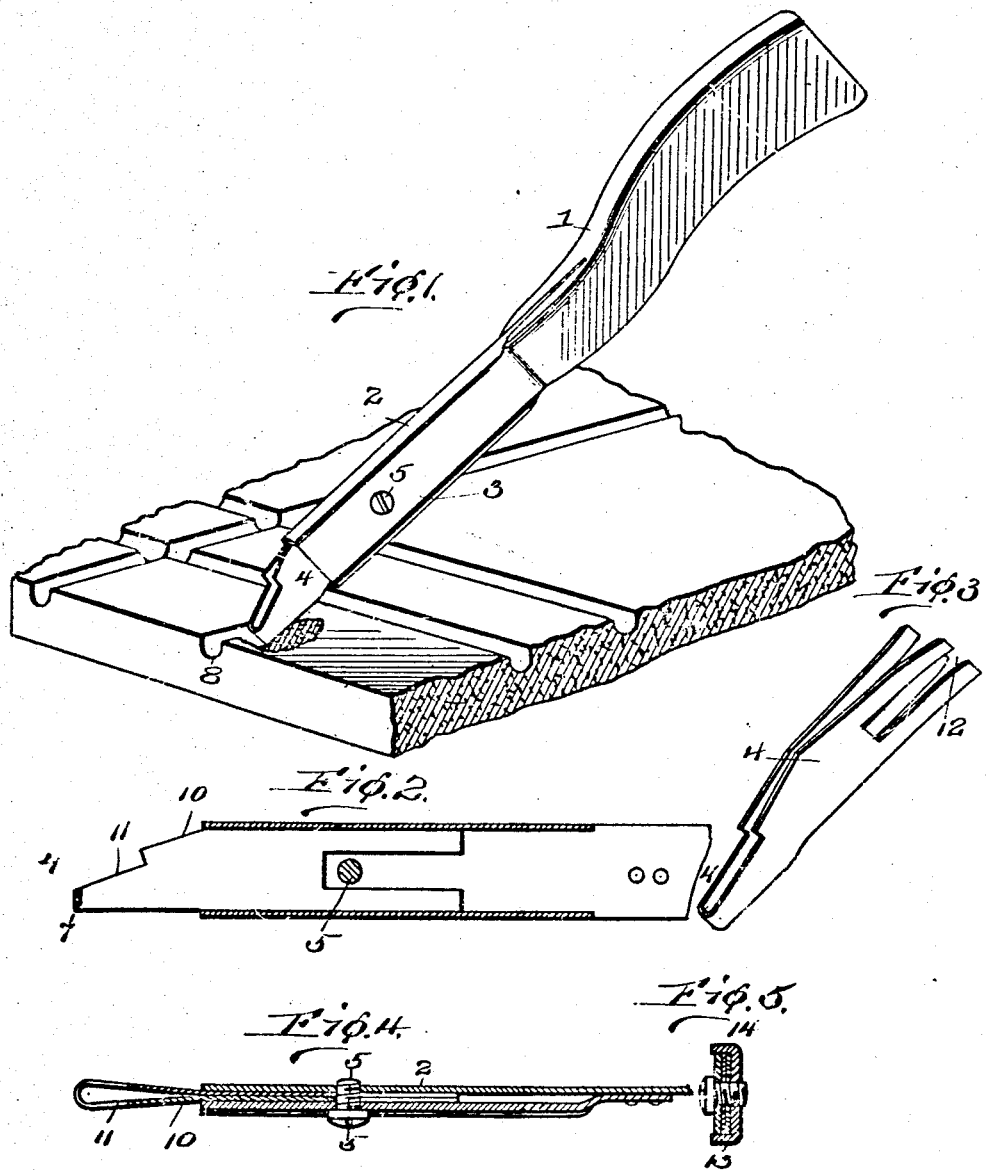

WILLIAM H. STARR, OF DENVER, COLORADO.

TILE-MARKER.

959,269.  Specification of Letters Patent.  Patented May 24, 1910.

Application filed June 30, 1909. Serial No. 505,278.

*To all whom it may concern:*

Be it known that I, WILLIAM H. STARR, a citizen of the United States, residing at Denver, in the county of Denver and State of Colorado, have invented certain new and useful Improvements in Tile-Markers; and I do hereby declare the following to be a full, clear, and exact description of the invention, such as will enable others skilled in the art to which it appertains to make and use the same.

This invention relates to improvements in tools, and particularly to tools for cutting imitation tile, and the like, and has for an object the arrangement of means easily operated and adjusted for cutting imitation tile in any shape or form desired.

Another object in view is the arrangement of a tile cutting or marking instrument arranged with an adjustable cutting blade adapted to be secured to the handle by any desired clamping means, as for instance a binding screw.

A still further object in view is the arrangement of a tool having a spring cutting blade formed with a substantially pointed end, a cut-away portion for permitting the free discharge of the material cut, and a cut-away portion for admitting a clamping screw which is adapted to clamp the cutting blade to the handle, the cut-away portion through which the clamping screw passes being adapted to permit the ready adjustment of the cutting blade as occasion may require.

With these and other objects in view, the invention comprises certain novel constructions, combinations and arrangement of parts as will be hereinafter more fully described and claimed.

In the accompanying drawings: Figure 1 is a perspective view of a tool embodying the invention, the same being shown in operation. Fig. 2 is a longitudinal section through the tool with the handle broken away. Fig. 3 is a detail perspective view of the cutting member removed from the handle. Fig. 4 is a section through a tool embodying the invention, approximately on line 4—4 of Fig. 2. Fig. 5 is a section through Fig. 4, approximately on line 5—5.

Referring to the accompanying drawings by numerals, 1 indicates the handle of a tile cutting or marking tool, and 2 the cutting member holder. The cutting member holder 2 is provided with a flexible clamping member 3 which is firmly clamped against the cutting member 4 by any desired means, as for instance a screw 5. Screw 5 is designed to pass loosely through member 3 and member 4 and be threaded into holder 2 so that when the screw is tightened the cutting member 4 will be tightly clamped in position.

Cutting member 4 is preferably made from spring material and is preferably formed of a single piece of metal bent upon itself in order to form a rounded end 6. Rounded end 6 is preferably sharpened at 7 to form a good cutting surface for cutting grooves 8 in a prepared surface 9, which may be any desired material, as for instance, cement, plaster paris, or plaster. The cutting member 4 is cut away so as to form an angle at 10, and also is further cut away at 11 in order that the end 6 may be very short, and act substantially as if the same was a point, though presenting a stronger structure, by reason of the amount of material contained therein by the bevel or slant given the end of the tool by the cut away portions 10 and 11. Cut-away portion 11 especially is of importance as the same permits the easy discharge of the material cut by cutting edge 7, and thus prevents any clogging, and consequent poor cutting or marking of the instrument. The cutting member 4 may be of any desired length, and is formed at its rear end with a notch 12 in each side for permitting the passage of screw 5. In forming the cutting member 4 of spring material the same is normally slightly spread when not in the holder 2, so that when positioned in holder 2 the same will not drop therefrom even though not tightened by screw 5. In order to properly hold cutting member 4 in position guiding flanges 13 and 14 are provided on holder 2 which also guide clamping member 3, as clearly seen in Fig. 5.

In operation when it is desired to use the instrument a surface is prepared of any desired material and the instrument is drawn thereover, guided if desired by a straight edge. Square blocks may be cut or any other shape as desired for imitating genuine tile, and the prepared surface may be painted or stained either before or after the cutting.

What I claim is:

1. In an instrument of the class described, a holder formed substantially U-shaped in cross section, a cutting member fitted into the holder and extending therefrom in the form of a loop, a binding member carried by the holder and engaging the cutting member, and means for securing the cutting member in engagement with the holder and the binding member.

2. In an instrument of the class described, a holder having flanges turned substantially at right angles to the main body portion, a cutting member positioned on the holder between the flanges and extending from the end thereof in the form of a loop, and means for securing the cutting member to the holder.

3. In an instrument of the class described, a holder provided at its end with a flexible clamping member spaced apart from the holder, a cutting member positioned between the flexible member and the holder, and extending therefrom, and means for securing the cutting member between the holder and the flexible member.

4. In an instrument of the class described, a holder formed substantially U-shaped in cross section, a flexible clamping member movable toward the holder, a cutting member formed of flexible material bent upon itself and carried by the flexible clamping member, the flexible cutting member having a slot formed in the end thereof and means passing through the slot and the holder and the clamping member for the purpose of securing the flexible clamping member and the cutting member to the holder.

5. In an instrument of the class described, a holder, and a cutting member secured thereto, said cutting member comprising a bifurcated rear end, a beveled front end having an offset arranged in the bevel, and a cutting point formed for cutting a predetermined shaped groove.

6. In an instrument of the class described, a holder formed substantially channel-shaped at one end, a clamping member positioned upon the holder within the channel, a cutting member positioned between the channel and the clamping member and projecting therefrom and formed of material bent upon itself, and means for securing the cutting member and the clamping member to the channel portion of the holder.

In testimony whereof I affix my signature in presence of two witnesses.

WILLIAM H. STARR.

Witnesses:
 CARLE WHITEHEAD,
 ALBERT L. VOGL.